US006510173B1

(12) United States Patent
Garmonov et al.

(10) Patent No.: US 6,510,173 B1
(45) Date of Patent: Jan. 21, 2003

(54) METHOD FOR THE ORTHOGONAL AND OFFSET TRANSMISSION-RECEPTION OF A SIGNAL AND DEVICE FOR REALIZING THE SAME

(75) Inventors: Alexandr Vasillevich Garmonov, L. Shevtsovoi (RU); Yuri Evgenievich Karpitski, Koltsovskaya (RU)

(73) Assignee: Centro de Technologia Vidriera Monterrey, S.A., Nuevo Leon (MX)

( * ) Notice: Subject to any disclaimer, the term of this patent is extended or adjusted under 35 U.S.C. 154(b) by 0 days.

(21) Appl. No.: 09/806,805

(22) PCT Filed: Sep. 22, 1999

(86) PCT No.: PCT/RU99/00351

§ 371 (c)(1),
(2), (4) Date: Apr. 3, 2001

(87) PCT Pub. No.: WO00/21214

PCT Pub. Date: Apr. 13, 2000

(30) Foreign Application Priority Data

Oct. 8, 1998  (RU) .......................................... 98118423

(51) Int. Cl.[7] .............................................. H04B 1/69
(52) U.S. Cl. ...................... 375/141; 375/146; 375/150
(58) Field of Search ................................. 375/130, 141, 375/140, 147, 146, 150, 149, 145, 148; 370/203, 204, 342, 335, 320

(56) References Cited

U.S. PATENT DOCUMENTS

| 4,694,467 A | | 9/1987 | Mui ............................. 375/1 |
| 5,103,459 A | | 4/1992 | Gilhousen et al. ............. 375/1 |
| 5,109,390 A | | 4/1992 | Gilhousen et al. ............. 375/1 |
| 5,535,239 A | * | 7/1996 | Padovani et al. ........... 375/130 |
| 5,663,990 A | | 9/1997 | Bolgiano et al. ........... 375/347 |
| 5,859,840 A | * | 1/1999 | Tiedemann et al. ......... 370/335 |

FOREIGN PATENT DOCUMENTS

| EP | 0605119 A2 | 7/1994 |
| RU | 2119254 C1 | 9/1998 |

OTHER PUBLICATIONS

K.H. Rosenbrock, Submission of Proposed Radio Technologies, ETSI–SMG2, Jan. 29, 1998, pp. 51–52, Section 5.6.3.1, "Orthogonal Transmit Diversity".
Tarokh et al., IEEE Transactions on Information Theory, vol. 44, No. 2, pp. 744–764, Mar. 1998, "Space–Time Codes for High Data Rate Wireless Communication: Performance Criterion and Code Construction".

* cited by examiner

*Primary Examiner*—Tesfaldet Bocure
(74) *Attorney, Agent, or Firm*—Abelman, Frayne & Schwab

(57) ABSTRACT

An information stream of binary symbols is divided into serial packets of N binary symbols. The method further includes serial-parallel conversion of binary symbols in each serial packet and repeating N times the parallel packet thus obtained in order to form a serial-parallel packet of binary symbols. The binary symbols are permuted in the duration interval of each serial-parallel packet, and orthogonal codes generated according to the above binary symbol permutation are then applied. A space-diversity channel is then assigned to each serial group of the serial-parallel packet of coded binary symbols thus obtained. All the serial groups of coded binary symbols, each coded binary symbol having been previously spread by a user spreading code, as well as pilot signals of the corresponding space diversity channels are simultaneously transmitted. The method also involves generating on the reception side a serial packet of soft decisions that corresponds to the serial packet of binary symbols on the transmission side.

5 Claims, 10 Drawing Sheets

METHOD FOR THE ORTHOGONAL AND OFFSET TRANSMISSION-RECEPTION OF A SIGNAL AND DEVICE FOR REALIZING THE SAME

FIELD OF THE INVENTION

The present invention relates to radio engineering, particularly to transmit-receive diversity methods and devices in code division multiple access (CDMA) communication systems.

DESCRIPTION OF THE RELATED ART

One of the common problems to CDMA cellular radio communications systems is multipath fading that reduces system capacity. The techniques of fading mitigation applied today allow to use only a part of potential non-fading channel capacity. Hence, creation of new anti-fading techniques with the purpose of further CDMA system capacity improvement is very critical at the moment.

The most effective anti-fading technique is diversity reception using M space diversity receiving antennas. The space positions of the antennas are selected to ensure weak correlation of signal fadings in different antennas. A disadvantage to the receive space diversity is high price and increased dimensions of the equipment. This particularly hinders application of the space receive diversity in mobile terminals. Hence, it is presently an important problem to provide an alternative fading combat technique having the same level of efficiency as the receive space diversity systems.

Various transmit diversity methods are known presently where a signal is transmitted from two or more space diversity antennas as shown on FIG. 1. Two or more diversity antennas are usually installed at a base station to provide the receive diversity. In case of diversity transmission, these antennas are also used as transmitting ones. The known methods of diversity transmission allow to provide mitigation of the adverse fading effect when a signal is received at one antenna. These transmit diversity methods, however, are far less effective than the receive diversity ones.

It is known a transmit-receive method disclosed in U.S. Pat. No. 5,109,390, where a data stream is modulated on the transmitting side and then transmitted via one space diversity channel (via one antenna). On the receiving side, the input signal is demodulated recovering the initial data stream.

Since the data stream is transmitted via one space diversity channel only, the signal at the receiving point may disappear at some time intervals due to the fading in the channel. As a result, reception of such a signal is characterized by high error rate. Decreasing of the error rate requires some measures to be taken to increase signal-to-noise ratio (SNR) at the receiver input and as a result leads to degradation of the communication system capacity.

There is a method for delay transmit diversity (see "Space-Time Codes for High Data Rate Wireless Communication: Performance Criterion and Code Construction". Vahid Tarokh. IEEE Transactions on Information Theory, vol. 44, No.2, March 1998), in which the same wideband signal is transmitted without delay via a first antenna, and with delays relative to one another via the rest of antennas, the delay value being no less than one chip of the spreading pseudo noise (PN) sequence. In this case the signal on the receiving side resembles a multipath signal and can be processed by the conventional Rake-receiver. However, this method has a substantial drawback. The known PN spreading sequences have imperfect autocorrelation properties, so signals arriving at the receiving side with different time delays act as severe interference to one another.

A method for orthogonal transmit diversity (OTD) in a CDMA system and an algorithm for its application is disclosed in the UMTS-2000 standard project for cellular CDMA systems developed by ETSI-SMG2 "Submission of Proposed Radio Transmission Technologies" issued Jan. 29, 1998, pp. 51–52, section 5.6.3.1 "Orthogonal Transmit Diversity".

The method according to the above solution is as follows.

A stream of user information symbols is split into two sub-streams, each sub-stream having different symbols of the initial stream. Each symbol in each sub-stream is repeated twice, thus doubling its duration. An orthogonal code with repetition period equal to the sub-stream symbol duration is assigned to each symbol sub-stream. Symbols of the first sub-stream are transmitted via a first antenna, and symbols of the second sub-stream are transmitted via a second antenna. Prior to signal transmission a conventional processing is performed which includes PN spreading and analog modulation. That way orthogonality is maintained between two and more output sub-streams. Note, that this OTD method does not require additional base station channelisation codes that represent one of the basic resources. The necessary orthogonal codes could be produced from one orthogonal code assigned to a user. Denote this code by $P_k$. Then two new orthogonal codes can be produced as $[P_k, P_k]$, $[P_k, -P_k]$. The brackets denote the concatenation operation. The repetition period of the orthogonal codes thus generated is twice the duration of the code assigned to the user and is equal to the duration of a sub-stream binary symbol.

Based on the description of the algorithm, a device on the transmitting side, according to this method, may be accomplished as shown on FIG. 2. The device according to FIG. 2 comprises M signal transmit branches 1-1–1-M, two modulators $8_1$–$8_2$ and two antennas $9_1$–$9_2$. Each transmit branch contains binary symbol stream splitter 2, the input of which is the input of the device, orthogonal code generator 3, orthogonal modulator 4, the first inputs of which are connected to the corresponding outputs of binary symbol stream splitter 2, and the second inputs—to the outputs of orthogonal code generator 3, the outputs of orthogonal modulator 4 are linked to the first inputs of PN spreader 5, the second input of which is joined to the output of the spreading PN code generator, the outputs of PN spreader 5 are connected to the corresponding first inputs of first $8_1$ and second $8_2$ modulators, the second inputs of first $8_1$ and second $8_2$ modulators are connected to the outputs of pilot signal generator 7, the outputs of modulators $8_1$ and $8_2$ are joined to first $9_1$ and second $9_2$ antenna, respectively.

For signal receiving, the UMTS standard project proposes a device described in the UMTS-2000 standard project for cellular CDMA systems developed by ETSI-SMG2 "Submission of Proposed Radio Transmission Technologies" issued Jan. 29, 1998, pp. 51–52, section 5.6.3.1 "Orthogonal Transmit Diversity". This device is accomplished as shown on FIG. 3.

The known device of FIG. 3 comprises multiplier 10, a first input of which is the information input of the device, and a second input is the second input of the device to which PN code is applied, the output of multiplier 10 is connected to the first inputs of multipliers 11, 13, 16 and 18, to the second inputs of which corresponding pilot codes of channels 1 to N are applied, the outputs of multipliers are joined to the inputs of corresponding combiners 12, 14, 17, and 19, the outputs of combiner 12 and combiner 14 are linked to the first and second inputs of multiplier 15, respectively, the outputs of combiner 17 and combiner 19 are connected to the first and second inputs of multiplier 20, respectively, the outputs of multipliers 15 and 20 are joined to the first and the second inputs of soft decision combining unit 21, respectively, the output of which is the output of the device.

The known device is similar to the Rake-receiver. Multipliers 10, 13 and combiner 14 represent correlator of the input signal to the pilot (reference) signal of the first antenna, multipliers 10, 18 and combiner 19 represent correlator of the input signal to the pilot signal of the second antenna.

The outputs of multipliers 15 and 20 are soft decisions on transmitted binary symbols in corresponding sub-streams.

Unit 21 combines soft decisions on symbols of two sub-streams into one stream of soft decisions.

The known device operates as follows.

On the transmitting side, an input binary symbol stream is applied to binary symbol stream splitter 2, where the stream is split into two sub-streams each containing different binary symbols of the initial stream (for example, $b_1$ streams in the first sub-stream, $b_2$—in the second sub-stream). In each sub-stream, each binary symbol is repeated twice, thus doubling the duration of each binary symbol as compared to the duration of initial stream binary symbol.

In unit 3, from user orthogonal code of the repetition period equal to the duration of initial stream binary symbol, two orthogonal codes of the repetition period twice the duration of initial stream binary symbol are generated. One of the generated orthogonal codes is assigned to one sub-stream and the other one—to the other sub-stream. These codes are supplied to the second input of orthogonal modulator 4, to the first input of which an output signal from binary symbol stream splitter 2 is sent.

In unit 4, the corresponding orthogonal codes are applied to the binary symbols of the sub-streams, respectively.

In unit 6, PN code is produced and applied to the second input of PN spreader 5, to the first input of which coded binary symbols of sub-streams are supplied.

In unit 5, coded binary symbols of each sub-stream are spread by the PN code, thus generating sub-streams of PN spread binary symbols.

Unit 5 passes the PN spread binary symbols of the first sub-stream to the first inputs of modulator $8_1$, and the PN spread binary symbols of the second sub-stream—to the first inputs of modulator $8_2$. The pilot signal of the corresponding space diversity channel generated in unit 7 is sent to the second inputs of modulators $8_1$ and $8_2$.

In units $8_1$ and $8_2$, PN spread binary symbols of the sub-streams and pilot signals are modulated and transmitted via the first $9_1$ and second $9_2$ antennas, respectively.

On the receiving side, a signal is received and analog demodulated.

Correlation of the input signal to the PN code and orthogonal codes of corresponding sub-streams is calculated using multipliers 10, 11, combiner 12, and multipliers 10, 16 and combiner 17.

Correlation of the input signal to pilot signals of space diversity channels is calculated using multipliers 10, 13 and combiner 14, which form correlator of the input signal to the pilot signal of the first space diversity channel, and multipliers 10, 18 and combiner 19, which form correlator of the input signal to the pilot signal of the second space diversity channel.

Multiplier 15 makes soft decision on transmitted binary symbol of the first sub-stream (b1).

Multiplier 20 produces soft decision on transmitted binary symbol of the second sub-stream (b2).

Unit 21 combines the two soft decision sub-streams into a single soft decision stream.

These known method and device are described for the case of two transmitting antennas. The cited document, however, indicates that the disclosed structure could be expanded for use with the number of antennas $N=2^n$.

In these known method and device, mitigation of fading effect is achieved due to the combined use of convolutional encoding and transmit diversity. Prior to transmission, the binary symbol stream is divided into frames and, in each frame, information binary symbols are coded by convolutional code. On the receiving side, signals transmitted via different antennas experience independent fading. It means reducing the probability that signals from both the antennas during receiving will simultaneously disappear. Due to deep signal fading in the radio channel connecting one transmitting antenna with the receiving antenna, a part of frame symbols can be received erroneously. However, redundancy introduced during the coding allows to recover the information symbols based on the correctly received part of the frame. Hence, during the receiving, error rate of the prototype method and device [3] is less than that of the prior art method [1]. Since the signals transmitted via different antennas are orthogonal, they do not create interference to each other during processing at the receiver. Therefore, SNR per coded binary symbol in this method is higher than in the method disclosed in "Space-Time Codes for High Data Rate Wireless Communication: Performance Criterion and Code Construction" by Vahid Tarokh published in IEEE Transactions on Information Theory, vol. 44, No.2, March 1998.

This known method, however, is much less efficient than the conventional receive space diversity, where each coded binary symbol of the frame is received via two or more space diversity channels (antennas). In the prototype method, each coded binary symbol is transmitted via one space diversity channel only, so, in the fading channel, reliability of receiving of each binary symbol is low. In order to improve reliability of receiving, it is necessary to increase the SNR that is equal to decreasing of capacity of the cellular communications system.

SUMMARY OF THE INVENTION

The object of the present invention is to provide a method of orthogonal receive-transmit diversity that improves CDMA communications system parameters, such as capacity and data transmission reliability through substantial mitigation of fading effects on the data receiving, and a reliable device implementing such a method.

This object can be achieved by a method of the orthogonal receive-transmit diversity, wherein, on the transmitting side, a spreading code is assigned to each information stream of binary symbols of each user, N transmit space diversity channels are formed, a pilot signal is generated for each transmit space diversity channel, on the receiving side, the transmitted signals are received and demodulated, N received vectors of pilot signals are determined, correlation of the input signal to the spreading code is calculated at the serial intervals of duration of a binary symbol of the received information stream, forming a sequence of correlation vectors, additionally, according to the present invention:

on the transmitting side, each information stream of binary symbols is split into serial information packets of N serial binary symbols, serial-to-parallel transformation of binary symbols is performed in each serial information packet, thus forming parallel information packet comprising N symbols, the parallel information packet is repeated N times, thus forming the serial-parallel information packet comprised of N parallel and N serial groups of binary symbols within the interval of the serial information packet duration, for each serial group of the serial-parallel information packet of binary symbols, an orthogonal code comprising N binary symbols is generated, thus forming a serial-parallel packet of binary orthogonal code symbols that consists of N parallel and N serial groups of binary orthogonal code symbols, binary symbols in the parallel groups of the serial-parallel information packet are reordered so that the binary symbols of each serial group are not repeated, binary symbols in the serial-parallel binary orthogonal code symbol packet are reordered the same way as in the serial-parallel information binary symbol packet, the serial-parallel information packet of the reordered binary symbols is scrambled by the serial-parallel packet of the reordered binary orthogonal code symbols, thus forming a serial-parallel packet of binary coded symbols, a space diversity channel is assigned to each serial group of the coded binary symbols of the serial-parallel information packet, each coded binary symbol is spread by user spreading code, serial groups of spread coded binary symbols of each information stream of each user and corresponding pilot signals are modulated and simultaneously transmitted via N transmit space diversity channels, on the receiving side: a sequence of correlation vectors is split into serial packets of N correlation vectors, each correlation vector is multiplied by the complex conjugate of received pilot signal vectors, and real part of each product is collected, thus forming serial-parallel packet of correlation coefficients, reordering, inverse to the reordering of serial-parallel information packet binary symbols on the transmitting side, is performed in the parallel groups of serial-parallel correlation coefficient packet, a serial-parallel packet of binary orthogonal code symbols, corresponding to the serial-parallel packet of orthogonal code symbols on the transmitting side and containing N serial and N parallel groups of binary orthogonal code symbols, is generated, correlation of the serial groups of serial-parallel correlation coefficient packet to the serial groups of serial-parallel orthogonal code symbol packet is calculated forming a parallel packet of N soft decisions corresponding to N binary symbols of parallel information packet on the transmitting side, parallel-to-serial transformation of parallel packet of soft decisions is carried out producing an output soft decision stream.

Reordering of binary symbols in the parallel groups of serial-parallel information packet is reasonable to perform by dyadic shift so that the binary symbols of the K-th parallel group are dyadically shifted by K−1.

Scrambling of the serial-parallel information packet of reordered binary symbols by the serial-parallel packet of reordered binary orthogonal code symbols is preferably performed by summation by modulo two of each binary symbol of the serial-parallel information packet of reordered binary symbols with the corresponding binary symbol of the serial-parallel packet of reordered binary orthogonal code symbols.

The object of the present invention can be also achieved by that the orthogonal transmit-receive diversity device comprises, on the transmitting side, M parallel branches of the user signal transmission, pilot signal generator, N modulators, N antennas, where each signal transmit branch contains serially linked orthogonal modulator and PN spreader, the second input of the PN spreader is connected to the output of PN code generator, each of N outputs of the PN spreader is joined to the input of corresponding modulator, the output of each modulator is connected with the corresponding transmit antenna; on the receiving side, an antenna, the output of which is linked to the input of the demodulator, correlator, calculating the correlation of the input signal to user's spreading code, N correlators, calculating the correlation of the input signal to pilot signals of space diversity channels, searcher, the first inputs of correlators and searcher are combined and linked to the output of demodulator, the second input of correlator, calculating the correlation of the input signal to user's spreading code, is connected to the first output of reference signal generator producing user's spreading code at the first output, the second inputs of N correlators are linked to the second outputs of reference signal generator producing channel pilot codes at the these outputs, the third output of reference signal generator is joined to the input of packet synchronizer, according to the present invention, on the transmitting side, the following is introduced into each signal transmit branch: a serial-parallel binary symbol packet generator, the input of which is the input of device, and the output is joined to the input of binary symbol reordering unit, serially linked serial-parallel binary orthogonal code symbol packet generator and binary orthogonal code symbol reordering unit, the second inputs of serial-parallel binary symbol packet generator, binary symbol reordering unit, serial-parallel binary orthogonal code symbol packet generator and binary orthogonal code symbol reordering unit are combined to form the second input of device, the outputs of binary symbol reordering unit and binary orthogonal code symbol reordering unit are connected to the first and second inputs of the orthogonal modulators, respectively.

On the receiving side there are introduced a serial correlation vector packet generator, the input of which is linked to the output of correlator, calculating the correlation of an input signal to user's spreading code, and the output—to the first input of serial-parallel correlation coefficient packet generator, the second inputs of serial-parallel correlation coefficient packet generator are joined with the outputs of N correlators, the second input of serial correlation vector packet generator and third input of serial-parallel correlation coefficient packet generator are combined and joined to the output of packet synchronizer, the output of serial-parallel correlation coefficient packet generator is connected to the input of correlation coefficient reordering unit, the output of correlation coefficient reordering unit is linked to the first input of correlator, the second input of correlator is connected to the output of serial-parallel binary orthogonal code symbol packet generator, the output of correlator is linked to parallel-to-serial transformation unit, the output of which is the output of device.

A unit of summation by modulo 2 is preferably used as the orthogonal modulator.

As a result of the newly proposed sequence of operations, on the transmitting side a combination of binary symbols of serial information packet emerges in each serial group. In other words, each serial group of binary symbols contains a set of all the symbols of the serial information packet but in different combinations. Reordering of binary symbols in serial-parallel binary orthogonal code symbol packet should be performed in the same manner as reordering of binary symbols in the serial-parallel information binary symbol packet. Upon completion of the operations of summation, spreading and modulation, serial groups of spread binary symbols, each containing the same set of binary symbols of input information stream, are simultaneously transmitted via different space diversity channels. Information streams transmitted via different space diversity channels do not create interference to each other, even though one and the same spreading code is used in each space diversity channel. As a result, even when due to fading a signal disappears in all the space diversity channels except one, information will not be lost because a complete information stream being transmitted via each space diversity channel. Combining of the information streams transmitted via the space diversity channels with independent fading thus significantly reduces error rate during information receiving without SNR increase at the receiver input. The obtained gain in noise stability can be used for communication system capacity increase.

BRIEF DESCRIPTION OF THE DRAWINGS

A preferred embodiment of the invention is described below with reference to the accompanying drawings in which.

DETAILED DESCRIPTION OF THE PREFERRED EMBODIMENTS OF THE INVENTION

Figure 6:
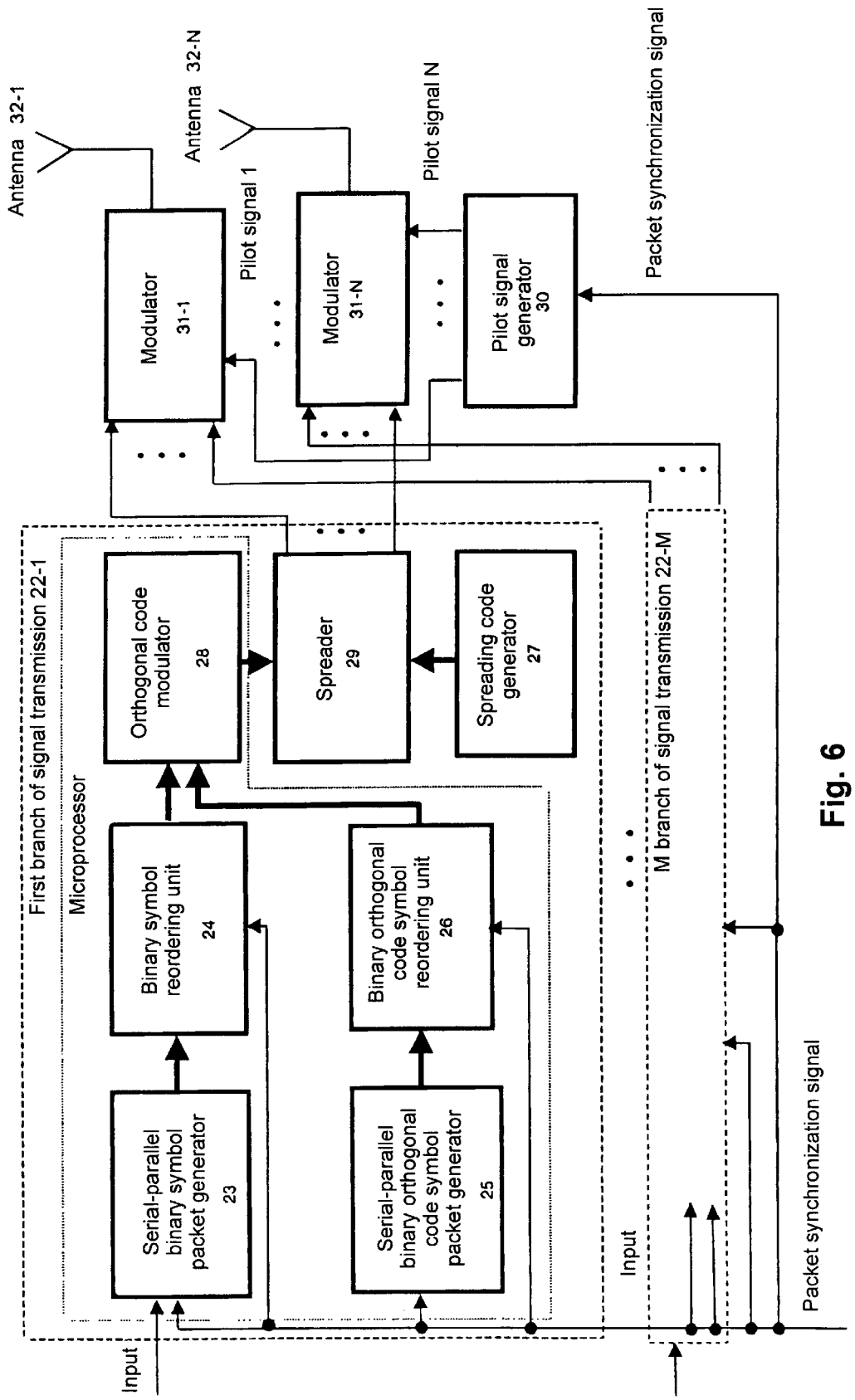
FIG. 6 is a device implementing the claimed method on the transmitting side.
Figure 7:
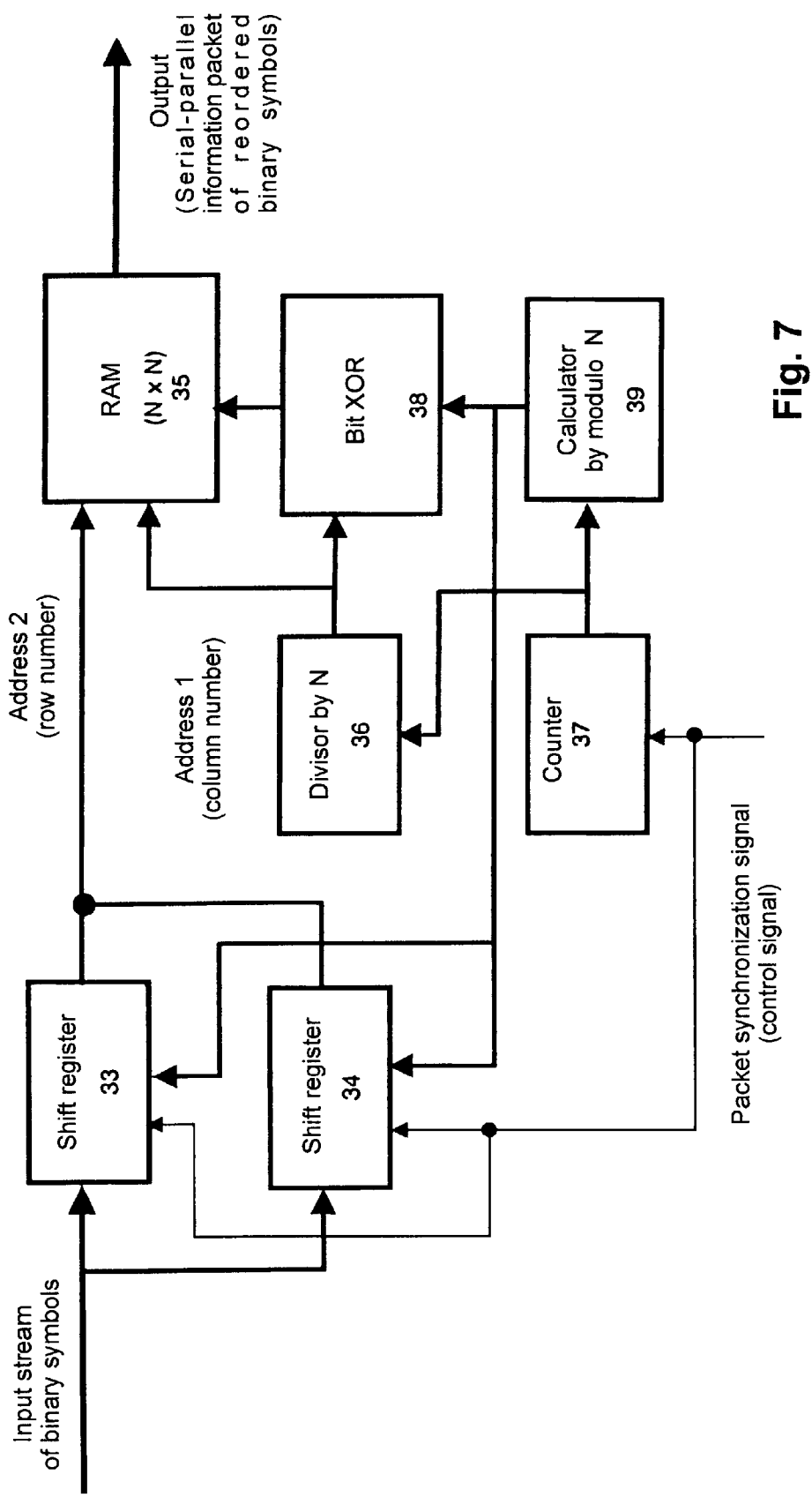
FIG. 7 is a block diagram of a binary symbol reordering unit for the device shown on FIG. 6.
Figure 8:
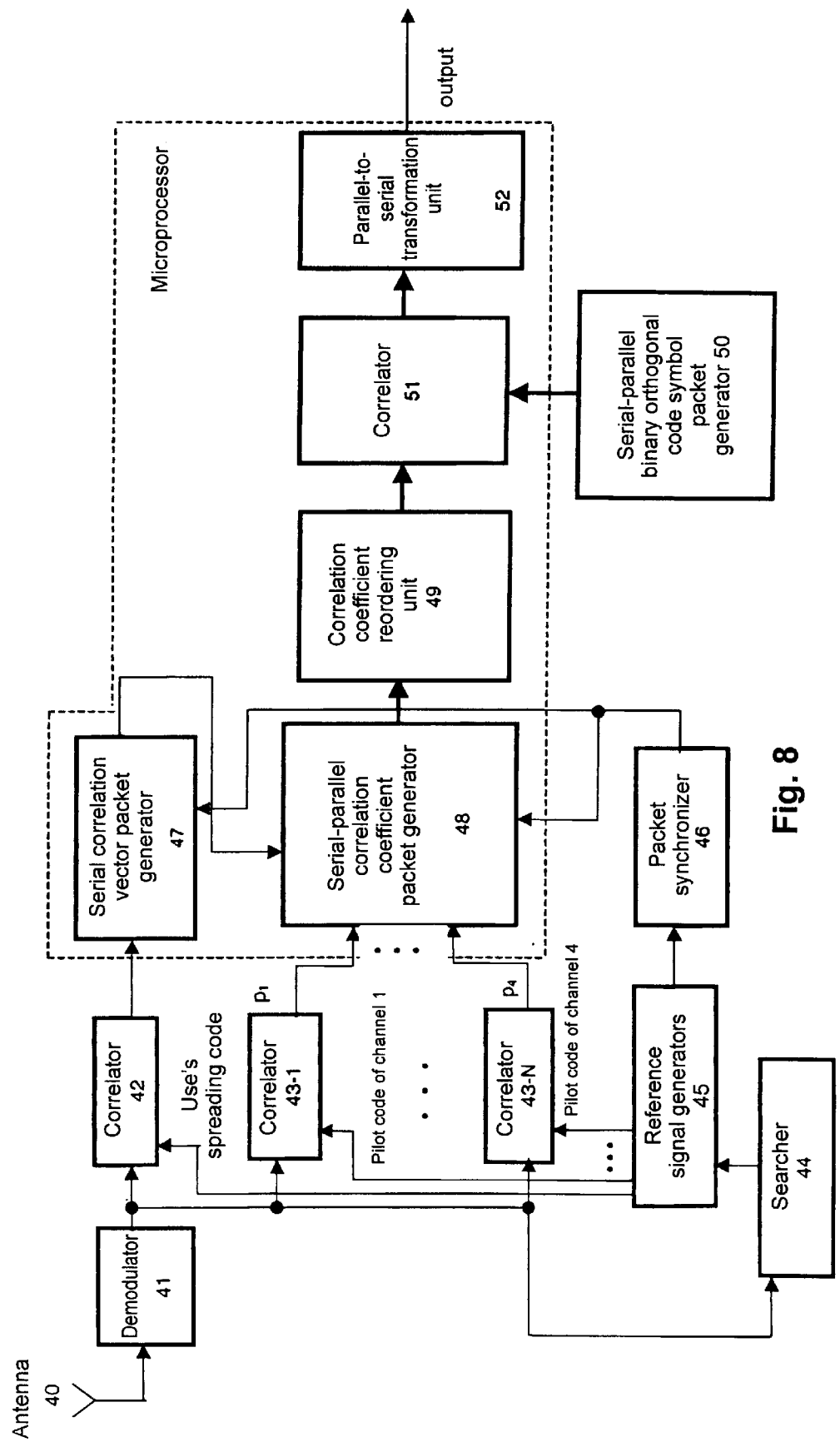
FIG. 8 is a device implementing the claimed method at the receiving side.

The device of orthogonal transmit-receive diversity according to the present invention, shown on FIGS. 6, 7 and 8, on the transmitting side (FIG. 6), contains: M signal transmit branches 22-1–22-M (let us assume that the system includes M users), pilot signal generator 30, N modulators 31-1–31-N and N antennas 32-1–32-N, each signal transmit branch 22-1–22-M contains serially linked generator of serial-parallel binary symbol packet generator 23 and binary symbol reordering unit 24, and also serially linked serial-parallel binary orthogonal code symbol packet generator 25 and binary orthogonal code symbol reordering unit 26, in each signal transmit branch 22-1–22-M, the first input of serial-parallel binary symbol packet generator 23 is the input of the device, the second input of serial-parallel binary symbol packet generator 23 is combined with the second inputs of binary symbol reordering unit 24, serial-parallel binary orthogonal code symbol packet generator 25 and binary orthogonal code symbol reordering unit 26 to form the second input of device, the output of binary symbol reordering unit 24 is linked to the first input of orthogonal modulator 28, the second input of orthogonal modulator 28 is connected to the output of binary orthogonal code symbol reordering unit 26, the output of orthogonal modulator 28 is joined to the first input of PN spreader 29, the second input of PN spreader 29 is connected to the output of PN code generator, the outputs of PN spreader 29 are linked to the corresponding first inputs of modulators 31-1–31-N, the second inputs of modulators 31-1–31-N are joined with the outputs of pilot signal generator 30, the outputs of modulators 31-1–31-N are connected to the corresponding transmit antennas 32-1–32-N.

The device according to the present invention (FIG. 8), on the receiving side, comprises: antenna 40, the output of which is linked to the input of demodulator 41, correlator 42, calculating the correlation of the input signal to user's spreading code, N correlators 43-1–43-N, calculating the correlation of the input signal to pilot signals of space diversity channels, searcher 44, the first inputs of correlators 42, 43-1–43-N and searcher 44 are combined and linked to the output of demodulator 41, the second input of correlator 42, calculating the correlation of the input signal to user's spreading code, is connected to the first output of reference signal generator 45, reference signal generator 45 generating user's spreading code at the first output, the second inputs of N correlators 43-1–43-N are joined to the second outputs of reference signal generator 45, generating diversity channel pilot codes at these outputs, the third output of reference signal generator 45 is linked to the input of packet synchronizer 46, serial correlation vector packet generator 47, the input of which is joined to the output of correlator 42, the output of serial correlation vector packet generator 47 is connected to the first input of serial-parallel correlation coefficient packet generator 48, the second inputs of serial-parallel correlation coefficient packet generator 48 are joined to the outputs of N correlators 43-1–43-N, the second input of serial correlation vector packet generator 47 and the third input of serial-parallel correlation coefficient packet generator 48 are combined and linked to the output of packet synchronizer 46, the output of serial-parallel correlation coefficient packet generator 48 is joined to the input of correlation coefficient reordering unit 49, the output of correlation coefficient reordering unit 49 is linked to the first input of correlator 51, the second input of correlator 51 is connected to the output of serial-parallel binary orthogonal code symbol packet generator 50, the output of correlator 51 is linked to parallel-to-serial transformation unit 52, the output of parallel-to-serial transformation unit 52 is the output of device.

Binary symbol reordering unit 24 can be implemented on a microprocessor or in hardware. FIG. 7 shows an exemplary hardware implementation of binary symbol reordering unit 24.

Binary symbol reordering unit 24 comprises first and second shift registers 33 and 34, the first inputs of which are combined and represent the input of binary symbol reordering unit 24, the outputs of first and second shift registers 33 and 34 are combined and linked to the first input of RAM 35, counter 37, the input of which is combined with the second inputs of first and second shift registers 33 and 34 to form the second input of binary symbol reordering unit 24, the output of counter 37 is joined to the input of divisor by N and the input of calculator by modulo N 39, the output of calculator by modulo N 39 is linked to the third inputs of second and first shift registers 34 and 33 and first input of XOR 38, the output of XOR 38 is joined to the third input of RAM 35, the output of divisor by N 36 is connected to the second input of XOR 38 and second input of RAM 35, the output of RAM 35 is the output of binary symbol reordering unit 24.

The method of orthogonal transmit-receive diversity according to the present invention is described below with references to the foresaid device.

The orthogonal transmit-receive diversity method according to the present invention is implemented in the transmitting base station equipment and in the receiving mobile station equipment. Implementation of the method implies neither more complex transmitting and receiving base and mobile station equipment, nor additional spreading codes.

Figure 1:
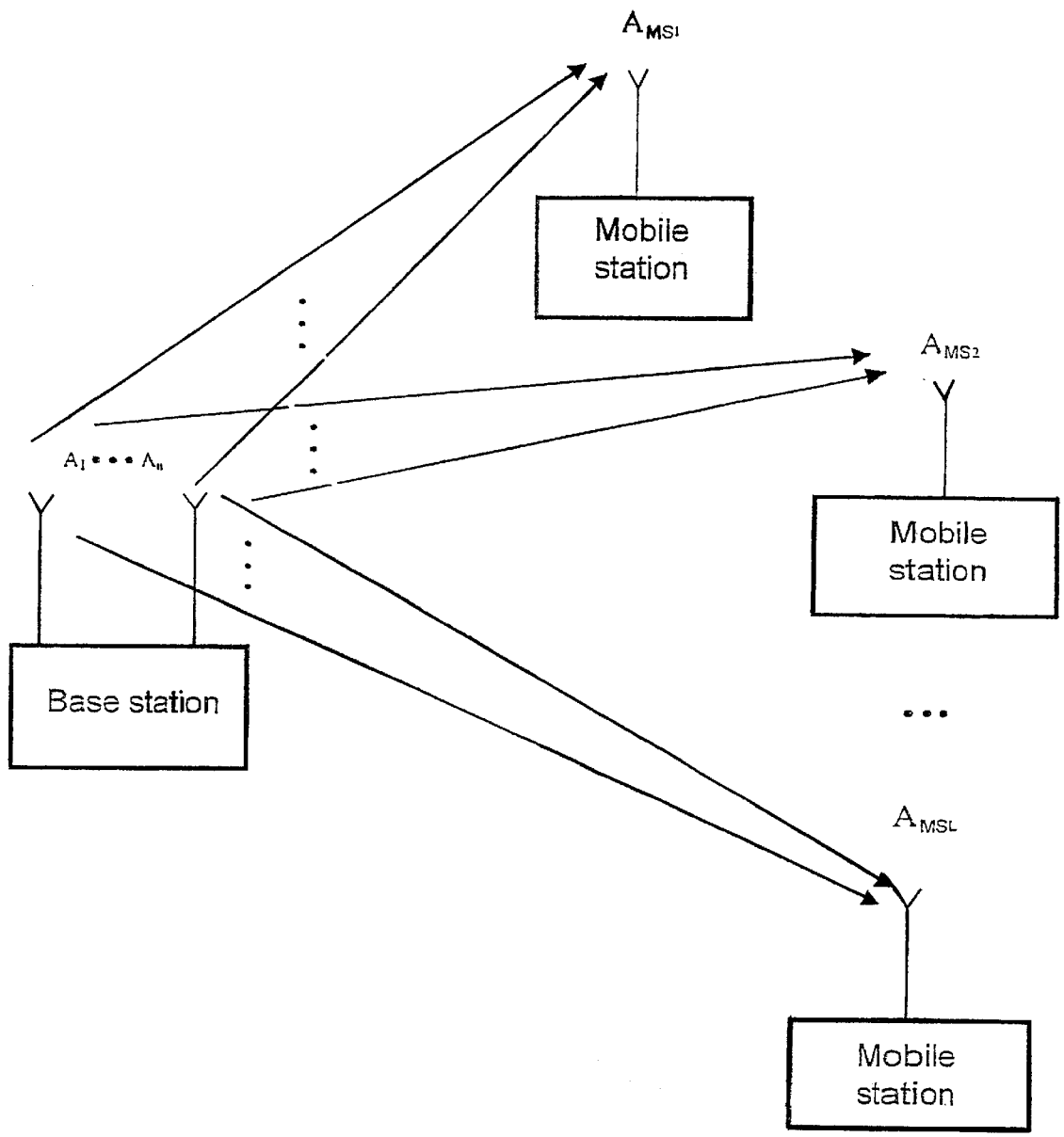
FIG. 1 is an illustration of a known method of the channel orthogonal receive-transmit diversity.
Figure 2:
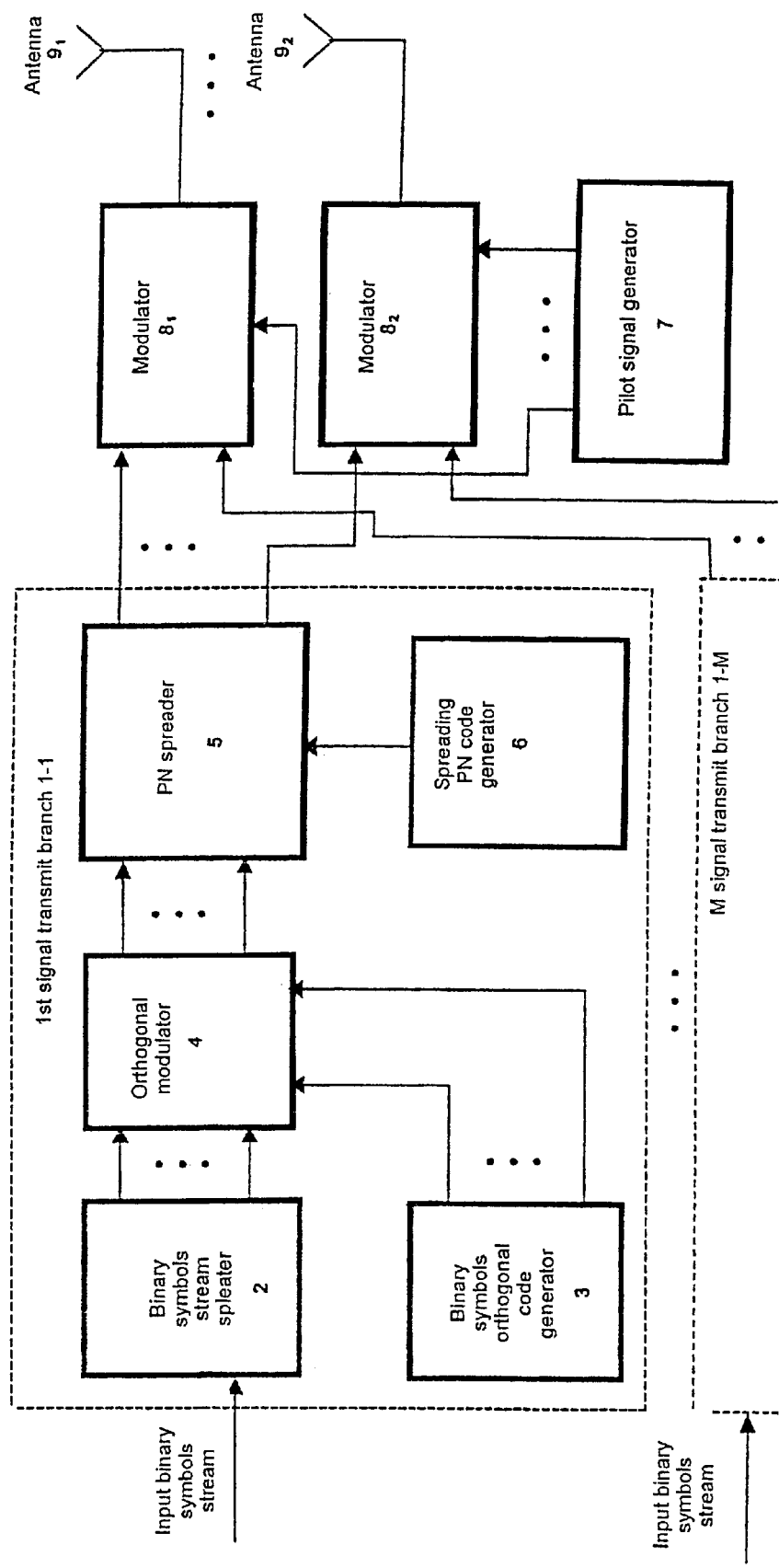
FIG. 2 is a block diagram of a prototype device (on the transmitting side)
Figure 3:
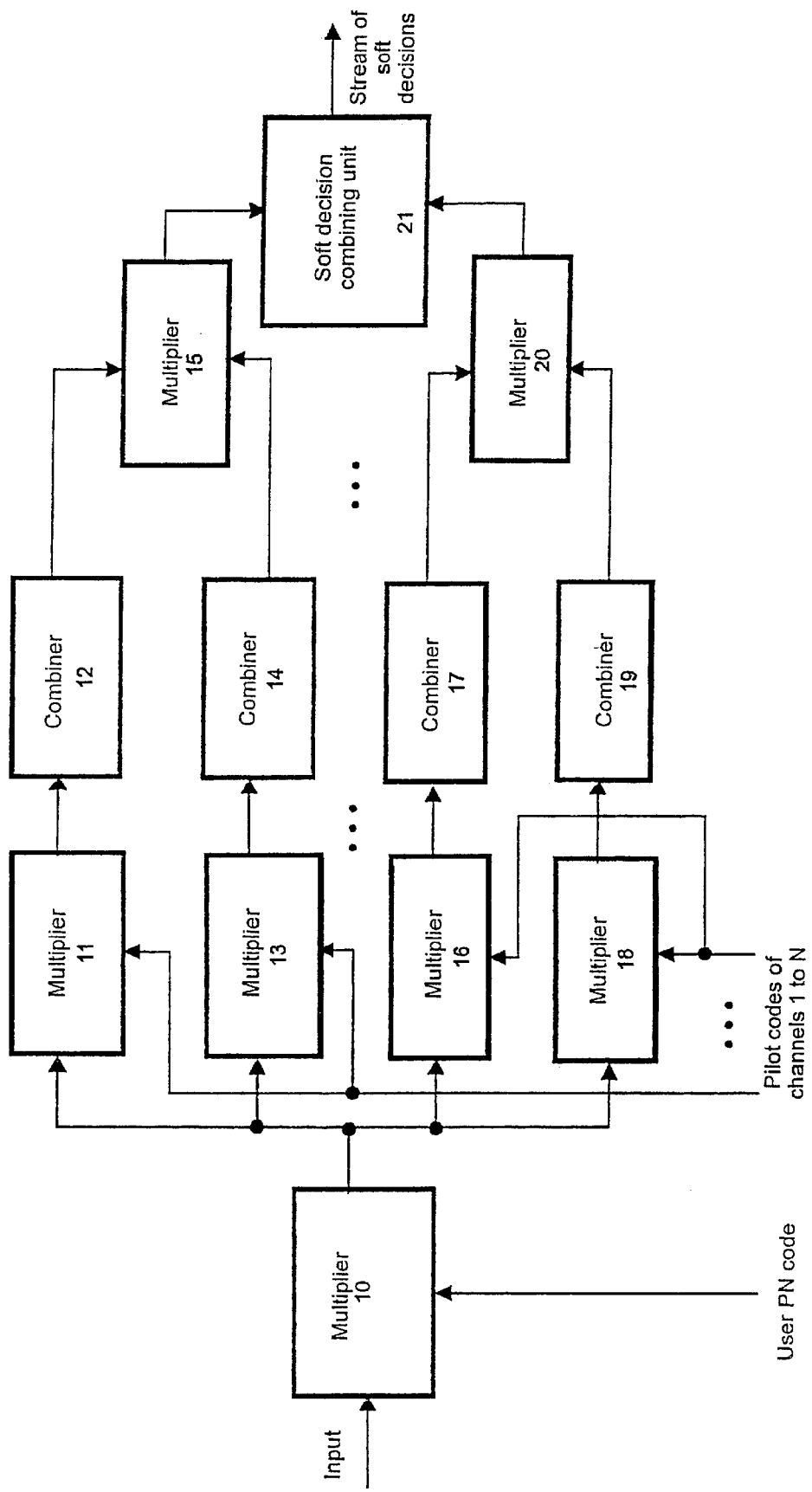
FIG. 3 is a block diagram of a prototype device (on the receiving side)
Figure 4:
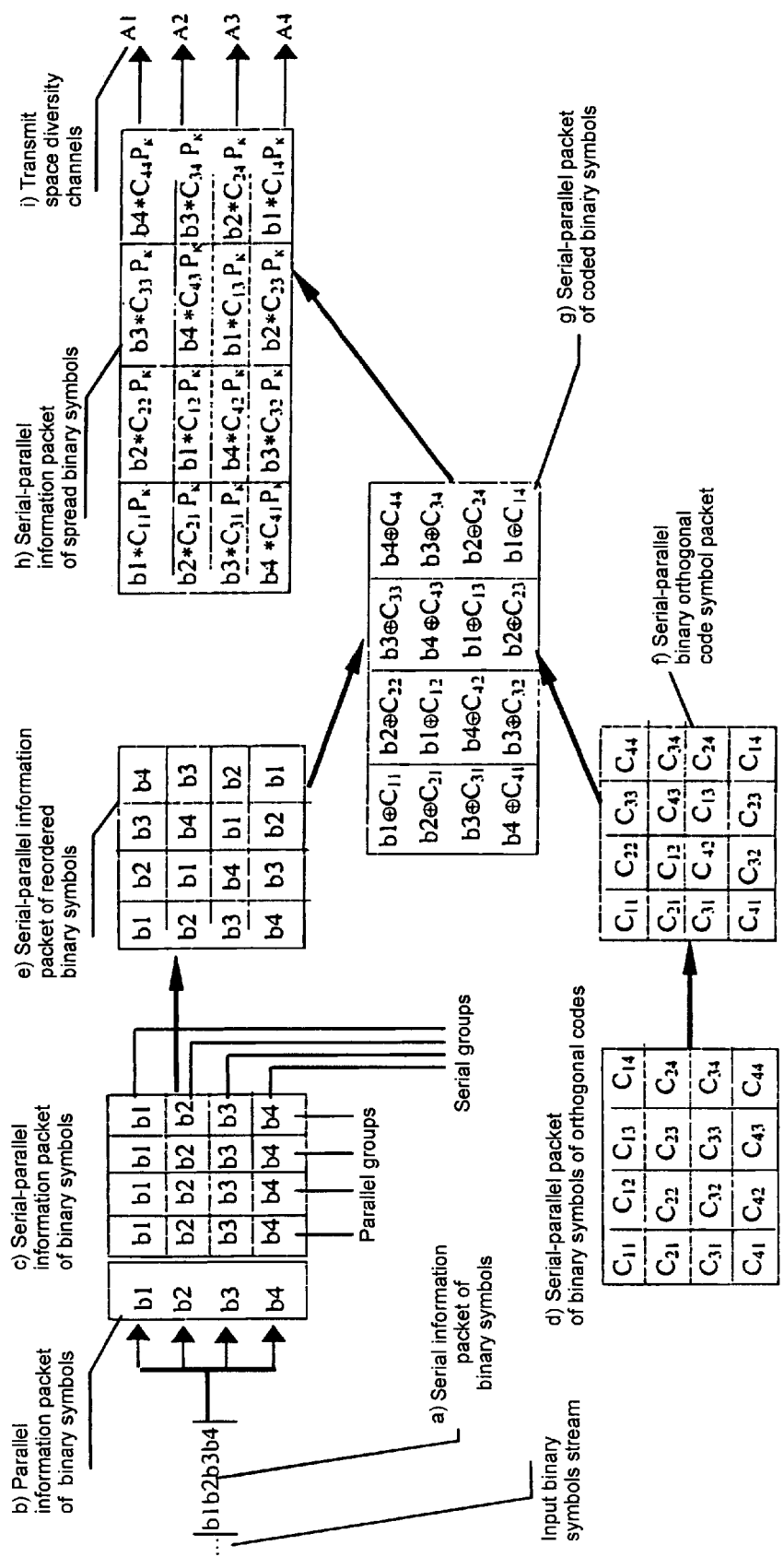
FIG. 4 is a sequence of operations of the claimed method on the transmitting side.

FIG. 4 illustrates a sequence of operations on the transmitting side. In particular, it shows the operations that are key to understanding of the present invention. Four transmit space diversity channels will be used to illustrate operation of the method.

On the transmitting side, spreading code $P_k$ is assigned to each information binary symbol stream of each user. Each information binary symbol stream is divided into serial information packets each comprising N serial binary symbols.

Denote binary symbols of current serial packet in the order of sequence thereof b1, b2, b3 and b4 (this operation is illustrated by position "a" on FIG. 4).

The serial-to-parallel transformation of binary symbols of serial information packet is executed forming a parallel information packet comprising 4 binary symbols (the operation is illustrated by position "b" on FIG. 4). The operation is performed by unit 23 shown on FIG. 6. The parallel information packet is repeated four times, thus forming a serial-parallel information packet of 4 parallel and 4 serial groups of binary symbols. Each parallel group contains all the symbols of serial information packet. Each serial group comprises four similar (repeated) binary symbols. This operation is illustrated on FIG. 4, position "c", executed also by unit 23 shown on FIG. 6.

The orthogonal code of 4 binary symbols is generated for each serial group of serial-parallel information binary symbol packet. For example, four codes: $C_1$, $C_2$, $C_3$ and $C_4$, the first code consists of binary symbols $C_{11}$, $C_{12}$, $C_{13}$, $C_{14}$, the second code consists of binary symbols $C_{21}$, $C_{22}$, $C_{23}$, $C_{24}$, the third code consists of binary symbols $C_{31}$, $C_{32}$, $C_{33}$, $C_{34}$, the fourth code consists of binary symbols $C_{41}$, $C_{42}$, $C_{43}$, $C_{44}$, hence, forming a serial-parallel packet of binary symbols of orthogonal codes comprising 4 parallel and 4 serial groups of binary orthogonal code symbols (see position "d" on FIG. 4). Unit 25 that executes this operation is shown on FIG. 6. The serial-parallel packet, serial groups of which form the Walsh functions, can serve as an example of the serial-parallel orthogonal code symbol packet.

| 1 | 1 | 1 | 1 | $C_{11}$, $C_{12}$, $C_{13}$, $C_{14}$ |
|---|---|---|---|---|
| 1 | −1 | 1 | −1 | $C_{21}$, $C_{22}$, $C_{23}$, $C_{24}$ |
| 1 | −1 | −1 | 1 | $C_{31}$, $C_{32}$, $C_{33}$, $C_{34}$ |
| 1 | 1 | −1 | −1 | $C_{41}$, $C_{42}$, $C_{43}$, $C_{44}$ |

Thus, ordering of the Walsh functions is important [4, N. Ahmed-K. R. Rao. Orthogonal Transformations in Digital Signal Processing. Moscow.:—"Svyaz". 1980, section 6].

The binary symbols in the parallel groups of the serial-parallel information packet are reordered so that the binary symbols of each serial group are not repeated. Thus each serial group contains a set of all the symbols of serial information packet but in different combination.

There are various methods of binary symbol reordering fulfilling the conditions described above. Consider one of them. Binary symbols of the first parallel group are not reordered. Binary symbols of the second parallel group are reordered in the following manner. The first binary symbol—to the second serial group, the second binary symbol—to the first serial group, the third binary symbol—to the fourth serial group, the fourth binary symbol—to the third serial group. Binary symbols of the third parallel group are reordered in the following manner. The third binary symbol—to the first serial group, the fourth binary symbol—to the second serial group, the first binary symbol—to the third serial group, the second binary symbol—to the fourth serial group. Binary symbols of the fourth parallel group are reordered in the following manner. The first binary symbol—to the fourth serial group, the second binary symbol—to the third serial group, the third binary symbol—to the second serial group and the fourth binary symbol—to the first serial group. This operation of the method is illustrated by FIG. 4, position "e". Binary symbol reordering unit 24 shown on FIG. 6 executes this operation.

The above example of reordering corresponds to the dyadic shift [4, N. Ahmed-K. Rao. Orthogonal Transformations in Digital Signal Processing. Moscow.:—"Svyaz". 1980, pp. 109–111] where the first parallel group remains unchanged, binary symbols of the second parallel group are dyadically shifted by one, binary symbols of the third parallel group are dyadically shifted by two, binary symbols of the fourth parallel group dyadically shifted by three.

The binary symbols of serial-parallel binary orthogonal code symbol packet are reordered the same way as the binary symbols of serial-parallel information binary symbol packet (this operation is illustrated on FIG. 4, position "f"). The operation is executed by unit 26 shown on FIG. 6.

The serial-parallel reordered binary orthogonal code symbol packet is applied to the serial-parallel information reordered binary symbol packet. This operation can be carried out in various manners, depending upon the type of the binary symbol representation. For example, if binary symbols take the value of either "0" or "1", then the above operation is summation by modulo two (or XOR operation). In this case each binary symbol of the serial-parallel packet of reordered information binary symbols is summed by modulo two with the corresponding binary symbol of the serial-parallel packet of reordered binary orthogonal code symbols, thus forming the serial-parallel packet of coded binary symbols. This operation is illustrated on FIG. 4, position "g". In the device this operation is implemented by orthogonal modulator 28 (see FIG. 6).

A space-diversity channel is assigned to each serial group of coded binary symbols of the serial-parallel information packet.

Each coded binary symbol of each serial group is spread by user's spreading code. Similarly to serial-parallel reordered binary orthogonal code symbol packet application, this operation can be fulfilled in various ways depending on the type of binary symbol representation, for example, by summation by modulo two of each coded binary symbol with the spreading code assigned to user's stream. This operation is illustrated by FIG. 4, position "h". In the device this operation is executed by PN spreader 29.

Four space diversity channels are generated (this operation is shown on FIG. 4, position "i"). In the device this operation is implemented by units 32-1–32-N (see FIG. 6).

The serial groups of spread coded binary symbols of each information stream of each user and corresponding pilot signals are modulated and simultaneously transmitted via four transmit space diversity channels. These operations are executed by units 31-1–31-N and 32-1–32-N (see FIG. 6).

Figure 5A:
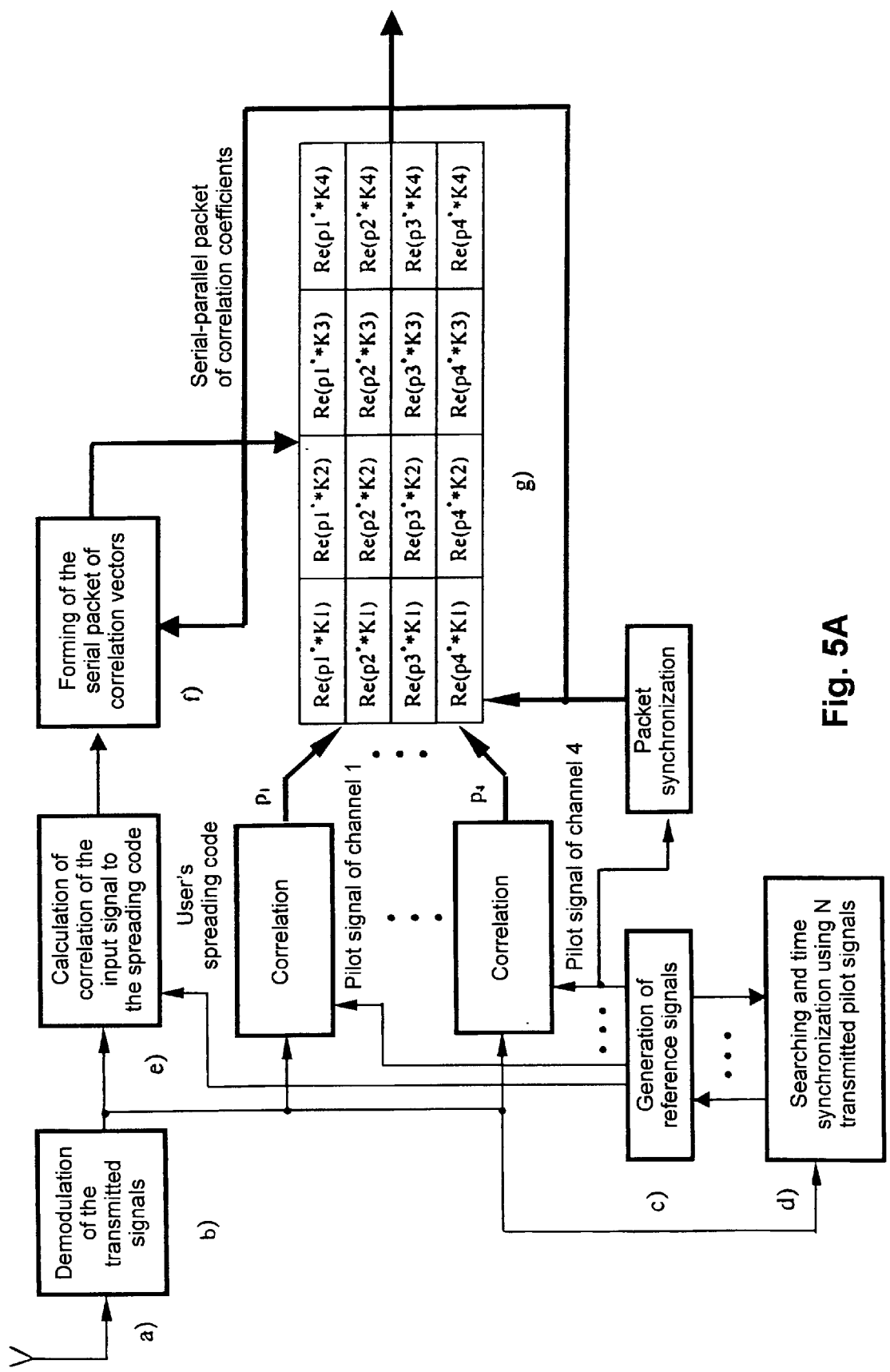
FIGS. 5A, 5B show a sequence of operations of the claimed method on the receiving side, FIG. 5B being continuation of FIG. 5A.
Figure 5B:
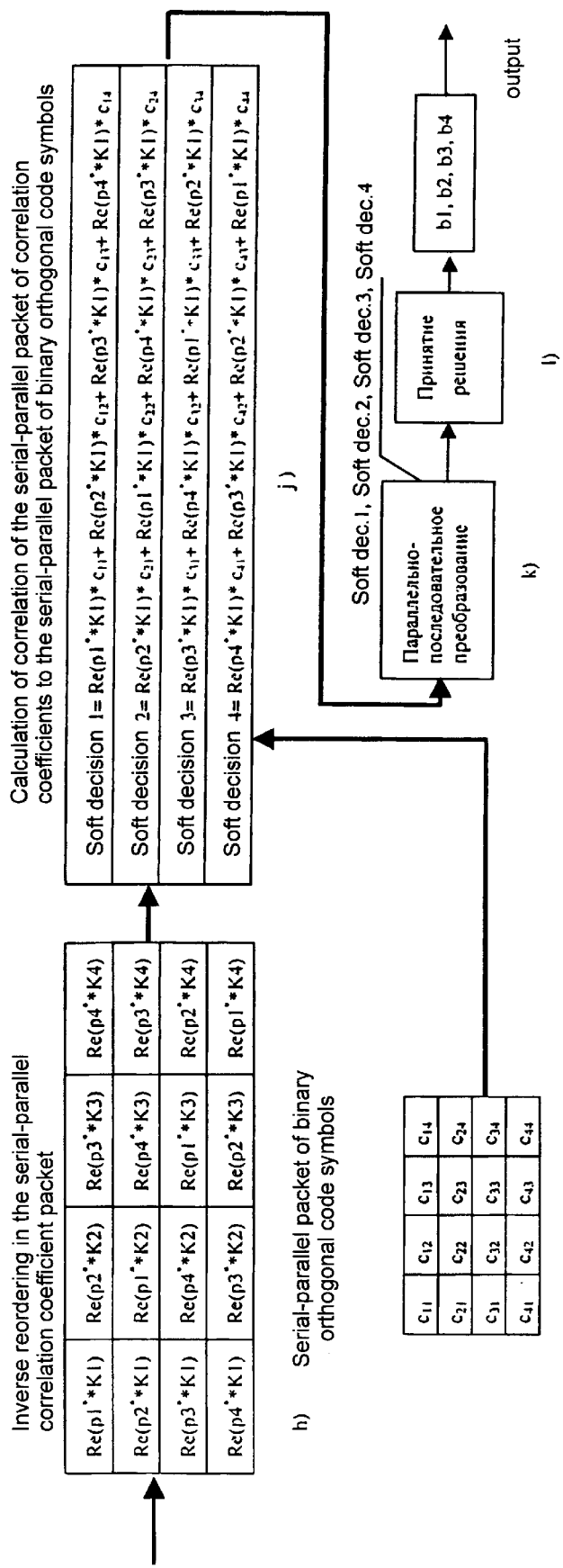

FIG. 5A and FIG. 5B illustrate a sequence of operations according to the present method on the receiving side. In particular, they show the operations that are essential to understanding of the present invention.

On the receiving side, transmitted signals are received and demodulated to produce an input signal. These operations are illustrated on FIG. 5A, positions "a" and "b", respectively. The units that implement this operation of the method according to the present invention are shown in FIG. 8 (antenna 40 and demodulator 41).

Reference signals (pilot signals and spreading code for each information stream of binary symbols of a given user on the receiving side) are generated similarly to the transmitting side. The operations according to the method of the present invention are illustrated on FIG. 5A, position "c", and, in the device, implemented by reference signal generator 45 shown on FIG. 8.

N received pilot signal vectors $P_1 \ldots P_4$ are defined. This operation of the present method is illustrated on FIG. 5A, position "e", and, in the device, the operation is implemented by means of correlators 43-1–43-N (see FIG. 8).

Correlation of the input signal to user's spreading code is calculated over the serial intervals of information binary symbol duration, producing the sequence of correlation vectors $K_1, K_2, K_3, K_4, \ldots$ (the operation is shown on FIG. 5A, position "e"). In the device, this operation is implemented by correlator 42 (FIG. 8). This operation can be implemented by means of other units, for example, matched filter.

The sequence of correlation vectors $K_1, K_2, K_3, K_4, \ldots$ is split into serial packets of N correlation vectors. The operation is illustrated on FIG. 5A, position "f". In the device, this operation is implemented by unit 47 (see FIG. 8).

Each correlation vector is multiplied in pairs by the complex conjugate of the pilot signal vectors ($P_1 \ldots P_4$) and the real part of each product is taken to form the serial-parallel packet of correlation coefficients. (this operation is shown on FIG. 5A, position "g"). In the device, it is implemented by unit 48 (see FIG. 8).

Reordering, inverse to the reordering of binary symbols of the serial-parallel information packet on the transmitting side, is carried out in the parallel groups of the serial-parallel correlation coefficient packet (the operation is illustrated on FIG. 5B, position "h"). In the device, the operation is implemented by unit 49 (see FIG. 8).

The serial-parallel packet of binary orthogonal code symbols, corresponding to the serial-parallel binary orthogonal code symbol packet on the transmitting side, comprised of 4 serial and 4 parallel groups of binary symbols of orthogonal codes is generated (the operation is illustrated on FIG. 5B, position "i"). In the device, it is implemented by unit 50 (FIG. 8).

The correlation of the serial groups of the serial-parallel packet of correlation coefficients to the serial groups of the serial-parallel packet of binary orthogonal code symbols is calculated to produce the parallel packet of 4 soft decisions (the operation is illustrated on FIG. 5B, position "j"). In the device, it is implemented by unit 51 (FIG. 8).

Parallel-to-serial transformation of the soft decisions of the parallel packet is carried out, thus forming the output stream of soft decisions (the operation is shown on FIG. 5B, position "k"). In the device, it is implemented by unit 52 (FIG. 8).

The orthogonal transmit-receive diversity method of the present invention will become more apparent from description of the device shown on FIGS. 6–8.

The method of the present invention is implemented, on the transmitting side, using a signal transmitter, the block diagram of which is shown on FIG. 6.

In the described embodiment, the transmitter that is used to implement the present method, according to FIG. 6, comprises M similar branches 22-1–22-M of signal transmission (one per user). Each signal transmission branch contains the following units.

Serial-parallel binary symbol packet generator 23, to the first input of which input information binary symbol stream is applied, and to the second—packet synchronization signal. In unit 23, information binary symbol stream is split into serial information packets, serial-to-parallel transformation of binary symbols in each serial information packet is carried out, forming the parallel packet of N binary symbols. The parallel information packet is repeated N times generating the serial-parallel information packet of binary symbols, i.e. the operations according to the present method illustrated on FIG. 4 by positions "a", "b" and "c" are carried out in unit 23.

Note that processing that the binary symbols were subjected to prior to their application to the input of unit 23 is not essential. In particular, reordered code symbols of frame can be used, as in the conventional CDMA standards [IS-95, cdma2000, UMTS].

Binary symbol reordering unit 24, to the first input of which the serial-parallel binary symbol packet of N parallel and N serial groups of binary symbols is supplied from unit 23 at the interval of serial information packet duration and to the second input—packet synchronization signal. Binary symbol reordering unit 24 reorders binary symbols in the parallel groups of the serial-parallel information packet so that binary symbols of each serial group are not repeated. Such reordering can be implemented, for example, by dyadic shift (i.e. unit 24 executes the operation shown on FIG. 4, position "e").

Serial-parallel binary orthogonal code symbol packet generator 25 that generates the serial-parallel packet of binary symbols of orthogonal codes by the packet synchronization signal (i.e. unit 25 executes the operation of the method shown on FIG. 4, position "d").

Binary orthogonal code symbol reordering unit 26, to the first input of which the serial-parallel packet of binary orthogonal code symbols of N parallel and N serial groups of binary orthogonal code symbols is supplied from unit 25, and to the second input of which the packet synchronization signal is sent. Binary orthogonal code symbol reordering unit 26 reorders binary symbols of orthogonal codes in the same manner as in the serial-parallel information packet of binary symbols (i.e. unit 26 executes the operation of the method shown on FIG. 4, position "f").

Orthogonal modulator 28, to the first input of which the serial-parallel information packet of reordered binary symbols is applied from unit 24, and to the second input of which the serial-parallel packet of reordered binary orthogonal code symbols is sent from unit 26. Symbolwise addition of codes can be carried out variously depending upon the type of binary symbol representation. For example, in case the representation "0" and "1" is used, it can be performed by summation by modulo two. Then summator by modulo two or XOR scheme may be used as orthogonal modulator 28. Unit 28 sums by modulo two each binary symbol of the serial-parallel information packet of reordered binary symbols with the corresponding binary symbol of the serial-parallel packet of reordered binary orthogonal code symbols, thus forming the serial-parallel packet of binary coded symbols (i.e. unit 28 executes the operation that is shown on FIG. 4, position "g").

Functionally, units 23, 24, 25, 26 and 28 can be implemented, for example, by a microprocessor.

Spreading code generator 27 generates spreading code of the user information stream.

Spreader 29, to the first input of which the serial-parallel coded binary symbol packet is applied from unit 28, and to the second input of which user's spreading code is supplied from generator 27. The operation of spreading of coded binary symbols of the serial-parallel coded binary symbol packet as earlier in unit 28 can be carried out variously depending upon the type of binary symbol representation. For example, it can be done by summation by modulo two of each coded binary symbol with the spreading code assigned to user information stream. Hence, summator by modulo two can be used as spreader 29 (i.e. spreader 29 executes the operation that is shown on FIG. 4, position "h").

Next, the transmitter according to FIG. 6 comprises pilot signal generator 30, N modulators 31-1–31-N and N antennas 32-1–32-N.

Pilot signal generator 30 generates different pilot signal for each transmit space diversity channel.

Modulators 31-1–31-N modulate the serial groups of spread coded binary symbols of each information stream of each user and corresponding pilot signals.

The serial groups of spread coded binary symbols of each information stream of each user and corresponding pilot signals are transmitted via 32-1–32-N antennas. Note that via one antenna its own serial group of spread coded binary symbols and corresponding pilot signal are transmitted.

As mentioned earlier, binary symbol reordering unit 24 is possible to implement using microprocessor. For better understanding of how it operates, its hardware implementation is given below. The block diagram of the unit is shown in FIG. 7.

Binary symbol reordering unit 24 operates in the following manner (see FIG. 7).

The input stream of binary symbols (from serial-parallel binary symbol packet generator 23, FIG. 6) is applied to the first 33 and second 34 shift registers. The input stream is generated by binary symbols of the serial-parallel information packet of binary symbols, where, first, binary symbols of the first parallel group follow, then, binary symbols of the second group do, and so on up to the N-th parallel group.

The first 33 or the second 34 shift register is activated by the packet synchronization signal (this signal is a control one). For example, if the control signal is "1", the first shift register 33 is activated, if "0"—the second shift register 34 is activated. In the active mode, the shift register stops fixing input stream symbols. In the inactive mode, the shift register fixes input symbols but switches output data bus to the high impedance state.

The packet synchronization signal has the form of meander duration of the half period of which is equal to the duration of the serial information packet. Meander fronts are timed to the beginnings or ends of the serial packets.

To the input of counter 37 the packet synchronization signal is applied which ascending and descending fronts initialize counter 37 to zero. Counter 37 calculates the number of binary symbols in the serial-parallel information packet of binary symbols and supplies the result to the inputs of divisor by N 36 and calculator by modulo N 39.

At the output of calculator by modulo N 39, modulo N of input number is calculated and then supplied to the third inputs of the second 34 and the first 33 shift registers, respectively, and also to the first input of XOR 38.

Output of divisor by N 36 is an integer part of the result of division of the input number by N. The output signal is supplied to the second (address) input of RAM 35 (matrix column number) and to the second input of XOR 38. The output of XOR 38 is the third (address) input of RAM 35 (matrix row number)

The contents of active shift register (first 33 or second 34) cell with the preset number at the address input is applied to the first input of RAM 35, and is saved in the cell with the column and row numbers preset at the address inputs.

Hence, RAM 35 generates the serial-parallel packet (for example, represented as a matrix) of reordered binary symbols. The output of RAM 35 is the output of binary symbol reordering unit 24.

The device of orthogonal transmit-receive diversity on the receiving side is shown on FIG. 8.

The device operates in the following manner.

Antenna 40 receives the input signal (the operation is illustrated on FIG. 5A, position "a").

Demodulator 41 demodulates the received signal (the operation is illustrated on FIG. 5A, position "b").

Correlator 42 computes the correlation of the input signal to spreading code of user's information stream (this operation is shown on FIG. 5A, position "e").

Correlators 43-1–43-N compute the correlation of the input signal to pilot signals of space diversity channels 1-N, respectively (the operation is illustrated on FIG. 5A, position "e").

Reference signal generator 45 generates user's spreading code and pilot signals of space diversity channels (the operation is shown on FIG. 5A, position "c").

Searcher 44 carries out input signal searching and time synchronization using N transmitted diversity channel pilot signals (the operation is shown on FIG. 5A, position "d").

Serial correlation vector packet generator 47 splits the sequence of correlation vectors at the output of unit 42 into the serial packets comprised of N correlation vectors (this operation is illustrated on FIG. 5A, position "f").

The serial-parallel correlation coefficient packet generator 48 multiplies in pairs each correlation vector of the serial correlation vector packet by the complex conjugate of pilot signal vectors and the real part of each product is collected to produce serial-parallel packet of correlation coefficients (this operation is shown on FIG. 5A, position "g").

Correlation coefficient reordering unit 49 performs reordering in the parallel groups of the serial-parallel correlation coefficient packet inverse to the reordering of binary symbols of the serial-parallel information packet on the transmitting side (this operation is shown on FIG. 5B, position "h").

Serial-parallel binary orthogonal code symbol packet generator 50 produces the serial-parallel packet of binary orthogonal code symbols corresponding to the serial-parallel binary orthogonal code symbol packet on the transmitting side (this operation is shown on FIG. 5B, position "i").

Correlator 51 computes the correlation of the serial groups of the serial-parallel correlation coefficient packet to the serial groups of the serial-parallel binary orthogonal code symbol packet, forming the parallel packet comprised of N soft decisions, corresponding to N binary symbols of the parallel information packet on the transmitting side (these operations are illustrated on FIG. 5B, position "j").

Parallel-to-serial transformation unit 52 performs parallel-to-serial transformation of soft decisions of the parallel packet forming the output stream of soft decisions (this operation is illustrated on FIG. 5B, position "k").

Functionally, units 47, 48, 49, 51, 52 can be implemented, for example, by microprocessor.

The present invention is implemented by available means known to the skilled in the art.

The units described as implemented by microprocessor (FIG. 6, FIG. 7, FIG. 8), can be implemented by modern digital signal processors (DSP), e.g. TMS 320C xx, Motorola 56 xxx, Intel, etc.

From the detailed description, the advantage of the present invention becomes more obvious against the conventional technical solutions consisting in that each binary symbol of information stream is transmitted via all the antennas. Thus, diversity order during receiving each binary symbol is equal to the number of transmit antennas (one receive antenna is assumed). At the same time, not obvious is another advantage of the present invention consisting in that binary symbols, simultaneously transmitted by different antennas, do not create interference to each other during receiving. Let us consider how it happens.

For further analysis it is convenient to use matrix notation. On the transmitting side, the stream of binary symbols is split into serial packets of N binary symbols each. As earlier assume N=4. Each such a packet can be represented as a vector-string of binary symbols:

$$\bar{b} = [b_1 b_2 b_3 b_4] \quad (1)$$

The operation of serial-to-parallel transformation carried out over the serial packet is equivalent to the transposition operation performed over the vector-row.

$$\bar{b}^T = \begin{bmatrix} b_1 \\ b_2 \\ b_3 \\ b_4 \end{bmatrix} \quad (2)$$

Repeating the vector-column 4 times, a matrix of binary symbols of the size 4×4 is produced.

$$\tilde{b} = \begin{bmatrix} b_1 & b_1 & b_1 & b_1 \\ b_2 & b_2 & b_2 & b_2 \\ b_3 & b_3 & b_3 & b_3 \\ b_4 & b_4 & b_4 & b_4 \end{bmatrix} \quad (3)$$

Reordering of binary symbols of each column of the matrix $\tilde{b}$ is performed so that different binary symbols emerge in each row. There are various variants of reordering meeting the above conditions, but, as it will become apparent later, only certain types of reordering provide for the best noise stability of transmit-receive diversity. One of the preferred embodiments of reordering is based on the rule of dyadic shift [4] N. Ahmed-K. R. Rao. Orthogonal Transformations in Digital Signal Processing. Moscow.:—"Svyaz". 1980, section 6.

Hence, the following matrix is produced:

$$\tilde{b}^1 = \begin{bmatrix} b_1 & b_2 & b_3 & b_4 \\ b_2 & b_1 & b_4 & b_3 \\ b_3 & b_4 & b_1 & b_2 \\ b_4 & b_3 & b_2 & b_1 \end{bmatrix} \quad (4)$$

Next step—formation of serial-parallel packet of binary orthogonal code symbols or simply orthogonal code matrix. The matrix of Walsh codes could be an example of such matrix, although other systems of orthogonal codes could be employed.

$$\tilde{C} = \begin{bmatrix} 1 & 1 & 1 & 1 \\ 1 & -1 & 1 & -1 \\ 1 & -1 & -1 & 1 \\ 1 & 1 & -1 & -1 \end{bmatrix} \quad (5)$$

Let us pay attention to Walsh code ordering that is none of the three known ordering types-Walsh, Hadamar, Paley [4, N. Ahmed-K. Rao. Orthogonal Transformations in Digital Signal Processing. Moscow.:—"Svyaz". 1980]. As it will become apparent later, the type of ordering is also important for noise stability.

Reordering of the matrix $\hat{C}$ elements is performed in the same manner as earlier for the matrix $\tilde{b}$ to produce the matrix:

$$\hat{C}^1 = \begin{bmatrix} 1 & -1 & -1 & -1 \\ 1 & 1 & -1 & 1 \\ 1 & 1 & 1 & -1 \\ 1 & -1 & 1 & 1 \end{bmatrix}$$

The serial-parallel packet of reordered binary orthogonal code symbols is applied to the serial-parallel information reordered binary symbol packet. This operation in the matrix theory is equivalent to the Kronecker product of the matrices $\hat{b}^1$ and $C^1$. The result is the matrix D (the serial-parallel packet of coded symbols)

$$D = \begin{bmatrix} b_1 & -b_2 & -b_3 & -b_4 \\ b_2 & b_1 & -b_4 & b_3 \\ b_3 & b_4 & b_1 & -b_2 \\ b_4 & -b_3 & b_2 & b_1 \end{bmatrix} \quad (6)$$

After the operation of spreading by user's spreading code $P_k$ and modulation, each row of the matrix D is transmitted via its own antenna (the first row—via the first antenna, the second row—via the second antenna, etc.).

The high frequency signal in the receiving point can be represented as:

$$\overline{X} = \overline{S} + \overline{N}, \quad (7)$$

where $$\overline{S} = \begin{Vmatrix} A_1 \cdot e^{j\varphi_1} \cdot P_k \cdot b1 - A_2 \cdot e^{j\varphi_2} \cdot P_k \cdot b2 - A_3 \cdot e^{j\varphi_3} \cdot P_k \cdot b3 - A_4 \cdot e^{j\varphi_4} \cdot P_k \cdot b4 \\ A_1 \cdot e^{j\varphi_1} \cdot P_k \cdot b2 - A_2 \cdot e^{j\varphi_2} \cdot P_k \cdot b1 - A_3 \cdot e^{j\varphi_3} \cdot P_k \cdot b4 - A_4 \cdot e^{j\varphi_4} \cdot P_k \cdot b3 \\ A_1 \cdot e^{j\varphi_1} \cdot P_k \cdot b3 - A_2 \cdot e^{j\varphi_2} \cdot P_k \cdot b4 - A_3 \cdot e^{j\varphi_3} \cdot P_k \cdot b1 - A_4 \cdot e^{j\varphi_4} \cdot P_k \cdot b2 \\ A_1 \cdot e^{j\varphi_1} \cdot P_k \cdot b4 - A_2 \cdot e^{j\varphi_2} \cdot P_k \cdot b3 - A_3 \cdot e^{j\varphi_3} \cdot P_k \cdot b2 - A_4 \cdot e^{j\varphi_4} \cdot P_k \cdot b1 \end{Vmatrix}$$

$A_i e^{j\varphi_i}$—complex amplitude or fading of the signal transmitted through the i-th transmit antenna in the receive antenna.

$$\overline{N} = \begin{Vmatrix} n_1 \\ n_2 \\ n_3 \\ n_4 \end{Vmatrix}$$

—noise vector; the noise is assumed here as Additive White Gaussian Noise (AWGN) with zero mean and power spectrum density of $$\frac{N_0}{2}.$$

Until now we have directly followed operations of the method set forth in the claims. For the further analyses, however, the signal vector $\overline{S}$ is conveniently rewritten as:

$$\overline{S} = P_k \cdot \hat{T}r \cdot \overline{b}^T, \quad (8)$$

where $$\hat{T}r = \begin{Vmatrix} A_1 \cdot e^{j\varphi_1} & A_2 \cdot e^{j\varphi_2} & A_3 \cdot e^{j\varphi_3} & A_4 \cdot e^{j\varphi_4} \\ A_2 \cdot e^{j\varphi_2} & -A_1 \cdot e^{j\varphi_1} & -A_4 \cdot e^{j\varphi_4} & A_3 \cdot e^{j\varphi_3} \\ A_3 \cdot e^{j\varphi_3} & A_4 \cdot e^{j\varphi_4} & -A_1 \cdot e^{j\varphi_1} & -A_2 \cdot e^{j\varphi_2} \\ A_4 \cdot e^{j\varphi_4} & -A_3 \cdot e^{j\varphi_3} & A_2 \cdot e^{j\varphi_2} & -A_1 \cdot e^{j\varphi_1} \end{Vmatrix}$$

is the transmit diversity matrix.

N rows of the transmit diversity matrix correspond to N serial transmission intervals of binary symbols of the serial information packet. N columns correspond to binary symbols of the serial information packet. Hence, the contents of the cell at the cross-point of the i-th row and the j-th column shows with which sign and via which antenna the j-th binary symbol of the serial information packet should be transmitted over the i-th time interval ($i=\overline{1,N}$, $j=\overline{1,N}$).

Processing on the receiving side is carried out according to the following expressions:

$$\overline{M} = Re(\hat{T}r^{*T} \cdot X \otimes P_k), \quad (9)$$

Where $\overline{M}$ the vector of soft decisions on binary symbols of the transmitted serial information packet; Re(*) denotes the operation of extraction of the real part of a complex number; $(\cdot)^T$—denotes the transpose operation, and $X \otimes P_k$—operation of taking the known user spreading code $P_k$ which can be implemented by usual correlator;

$^T$—denotes operation of transposition, and * is complex conjugation operation; $\hat{T}r$ is the transmit diversity matrix completely similar to $\hat{T}r$ matrix, but formed in the receiver by estimation of complex amplitudes of N transmit antennas signals. Estimation of each complex amplitude is based on pilot signal of the corresponding transmit antenna.

Assume that fading is sufficiently slow and complex envelopes of the transmitting antenna signals are almost constant over N adjacent time intervals of information binary symbol duration and their estimation in receiver is perfect, then expanding the expression (9) we will obtain the following:

$$\overline{M} = G \cdot \left(\sum_{i=1}^{4} A_i^2\right) \cdot \overline{b}^T + \overline{NN} \quad (10)$$

where G—number of chips in user's spreading code $P_k$, this parameter is also referred in literature as processing gain [5, William C. Y. Lee, Overview of Cellular CDMA/IEEE Transactions on Vehicular Technology, vol. 40, No.2, May 1991, p. 294]), $$\overline{NN} = Re(\hat{T}r^{*T}\overline{N} \otimes P_k) = \begin{Vmatrix} nn_1 \\ nn_2 \\ nn_3 \\ nn_4 \end{Vmatrix} - \text{the noise vector,}$$

the elements of which are real random values distributed according to the Gaussian law with zero mean and variance $$\frac{N_0}{2} \cdot G \cdot \left(\sum_{i=1}^{4} A_i^2\right).$$

Hence, the method of binary symbol reordering in the matrix of binary symbols $\hat{b}$ and the matrix of orthogonal codes $\hat{C}$ are necessary to form the transmit diversity matrix $\hat{T}r$ with the feature $$Re(\hat{T}r^{*T} \cdot \hat{T}r) = \left(\sum_{i=1}^{4} A_i^2\right) \cdot I, \text{ where} \quad (11)$$

$$I = \begin{Vmatrix} 1 & 0 & 0 & 0 \\ 0 & 1 & 0 & 0 \\ 0 & 0 & 1 & 0 \\ 0 & 0 & 0 & 1 \end{Vmatrix} \text{ is identity matrix.}$$

From the expression (10) the following two main conclusions can be derived.

1. Multiplier $$\left(\sum_{i=1}^{4} A_i^2\right)$$

at each binary symbol indicates the diversity effect of the 4-th order.

2. Each soft decision does not contain interfering items caused by other binary symbols, i.e. during receiving, binary symbols of the serial packet do not cause interference to each other. Interference is caused by AWGN at the input of the receiver only, and the value of this interference at the output of receiver is just the same as that of receiver performing diversity receiving at 4 receive space diversity antennas according to MRC algorithm. The signal-to-noise ratio is the same for all the binary symbols of the serial information packet and constitutes the value of $$SNR = \frac{\left(G\left(\sum_{i=1}^{4} A_i^2\right)\right)^2}{\frac{N_0}{2} G\left(\sum_{i=1}^{4} A_i^2\right)} = \frac{G\left(\sum_{i=1}^{4} A_i^2\right)}{\frac{N_0}{2}}, \quad (12)$$

Given similar $A_i$, $i=\overline{1,N}$ and $N_0$, the same SNR per binary symbol will be at the output of receiver carrying out diversity receiving at 4 receive antennas by MRC algorithm [6, William C. Y. Lee, Mobile Communication Systems Technique. M.: Radio y Svyaz, 1985]. Thus, the present method is optimum by the criterion of SNR maximum at the output of receiver (MRC).

The above analysis spreads directly to the arbitrary number of transmit antennas N.

Hence, we can make a conclusion that, as far as efficiency of mitigating the fading impact on receiving is concerned, the filed invention is fully equivalent to diversity receiving at N receive space diversity antennas by MRC algorithm.

In order to confirm the advantages of the present invention, comparative analysis of the present invention and known technical solutions in this field has been carried out. Noise stability and cell capacity increase have been compared.

Comparison of the method according to the present invention and technical solutions known in the art has been performed under conditions of CDMA IS-95 forward channel [5, TIA/EIA IS-95-A, Mobile Station—Base Station Compatibility Standard for Dual-Mode Wideband Spread Spectrum Cellular System, May 1995]. The following traffic channel parameters have been set: data transmission rate— 9600 kbps, 192 binary symbols per frame including 8 tail bits and 12—CRC bits, coding rate—½, coder length—9, interleaver as a 16×24 matrix. Propagation channel model includes independent Rayleigh fadings of signal transmitted from each BS antenna at the frequency of 30 Hz. Multiple access interferences from other cells and natural noises have been simulated by AWGN. The number of transmit antennas at BS N=2,4,8.

Figure 9:
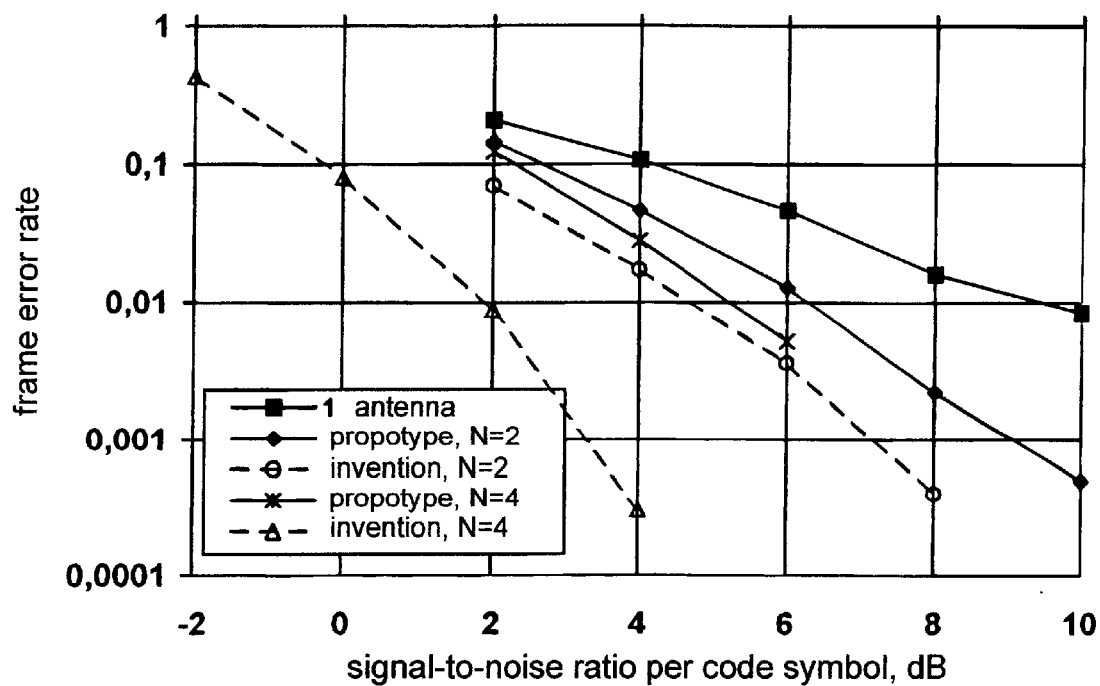
FIG. 9 shows frame error rate curves obtained with the help of a computer simulation of the algorithms of the orthogonal transmit diversity for the prototype and the present invention.

FIG. 9 shows FER (frame error rate) curves obtained by computer simulation of the prototype OTD algorithm and the present invention for the above conditions.

Analysis of the curves on FIG. 9 shows that the orthogonal transmit-receive diversity method according to the present invention provides the best noise stability.

The Table contains the required SNR values per code symbol to obtain the receiving frame error probability of 0.01.

TABLE

Required SNR values per code symbol to obtain the receiving frame error probability of 0.01.

| Number of antennas at BS (N) | Required $E_b/N_0$ for signal transmission via one antenna, dB | Required $E_b/N_0$ for the prototype, dB | Required $E_b/N_0$ for the present invention, dB |
|---|---|---|---|
| 2 | 11.5 | 8.5 | 7.5 |
| 4 | 11.5 | 6.3 | 4.6 |

It follows from the Table, that the energy gain of the present invention against the prototype is 1.5 dB at N=2, and 3.3 dB at N=4. Corresponding cell capacity increase is 1.41 times at N=2, an 2.14 times at N=4.

Especially noticeable is the effect produced by the present invention when compared to transmission of signal via one antenna. In this case corresponding capacity increase will be 2.6 times at N=2, and 5.13 times at N=4.

Figure 10:
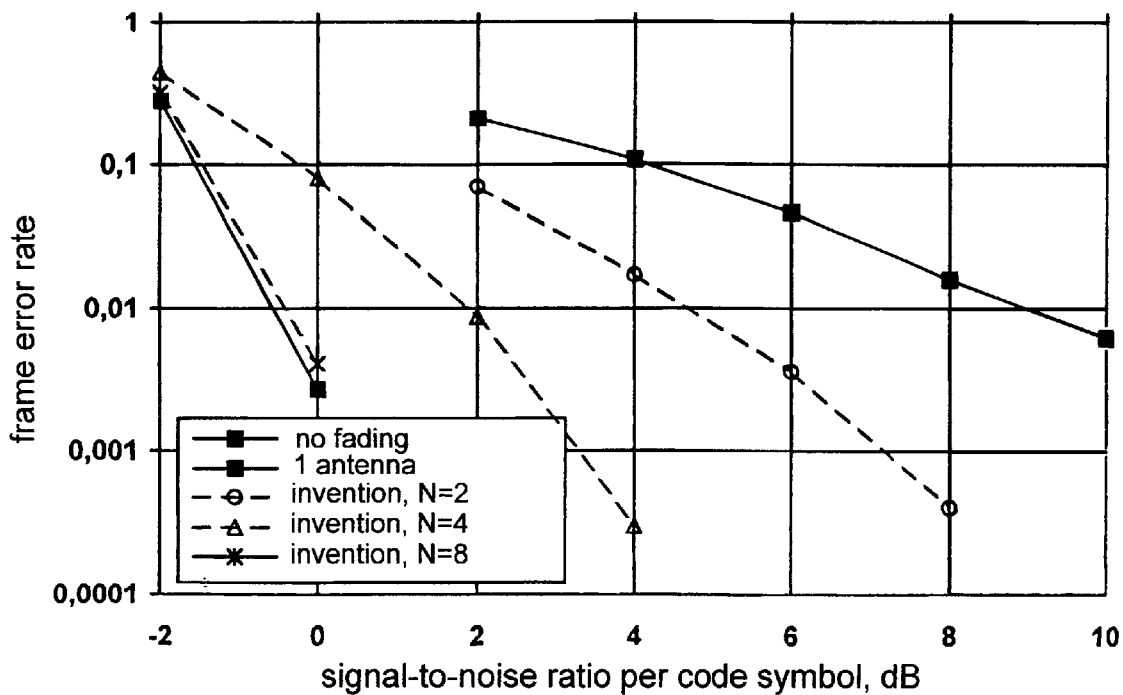
FIG. 10 shows frame error rate curves obtained with the help of a computer simulation of the present invention for 2, 4 and 8 transmit antennas.

FIG. 10 illustrates the dependence of FER upon SNR per code symbol for the method of the present invention at N=2, 4, 8. For comparison, FER curves for signal transmission via one antenna and FER curve for the static (non-fading) channel are provided. From this figure, employment of the present invention with 8 transmit antennas allows to implement non-fading channel capacity in practice. In this case the cell capacity increase compared to signal transmission via one antenna approximately amounts to 7 times.

Since it has been proven that the present invention has the same efficiency of fading mitigating as diversity receiving at the respective number of receive antennas, various combinations of these two methods are possible. For example, as it follows from FIG. 10, to obtain non-fading channel capacity, diversity order of 8 is needed. This order is possible to obtain using the method for 4 antennas on the transmitting side and 2 antennas on the receiving side. Different combinations of the method of the present invention of the transmit diversity with receive diversity method are possible employing N transmit diversity antennas and M receive diversity antennas. The resulting diversity order will constitute the value of N·M.

Hence, it is possible to conclude that employment of the present invention dramatically reduces the adverse impact of fading upon a communication system up to its complete elimination given the sufficient number of the transmit and receiving antennas. As a result, many communication system parameters become improved, including communication quality and cell capacity which can be increased by several times.

INDUSTRIAL APPLICABILITY

The present method and the device for orthogonal transmit-receive diversity are provided for use in CDMA telecommunications systems.

What is claimed is:

1. Orthogonal transmit-receive diversity method including, on the transmitting side, assigning a spreading code to each information binary symbol stream of each user, generating of N transmit space diversity channels, generating a pilot signal for each transmit space diversity channel, on the receiving side, receiving and demodulating the transmitted signals, determining N received vectors of pilot signals, calculation of correlation of the input signal to spreading code over the serial intervals of duration of binary symbol of the received information stream, forming the sequence of correlation vectors, characterized in that, on the transmitting side, each information binary symbol stream is split into serial information packets, each containing N serial binary symbols, serial-to-parallel transformation of binary symbols is performed in each serial information packet, forming the parallel information packet of N binary symbols, the parallel information packet is repeated N times, thus forming the serial-parallel information packet of N parallel and N serial groups of binary symbols over the interval of serial information packet duration, orthogonal code of N binary symbols is generated for each serial group of the serial-parallel information packet of binary symbols, thus forming the serial-parallel packet of binary symbols of orthogonal codes that is comprised of N parallel and N serial groups of binary symbols of orthogonal codes, binary symbols of the parallel groups of the serial-parallel information packet are reordered so that binary symbols of each serial group are not repeated, binary symbols of the serial-parallel packet of binary symbols of orthogonal codes are reordered in the same manner as in the serial-parallel information binary symbol packet, the serial-parallel information packet of reordered binary symbols is scrambled by the serial-parallel packet of reordered binary symbols of orthogonal codes, thus forming the serial-parallel packet of binary coded symbols, each serial group of coded binary symbols of the serial-parallel information packet is assigned a space diversity channel, each coded binary symbol is spread by user's spreading code, the serial groups of spread coded binary symbols of each information stream of each user and corresponding pilot signals are modulated and simultaneously transmitted via N space diversity channels, on the receiving side the sequence of correlation vectors is split into serial packets of N correlation vectors, each correlation vector is multiplied by the complex conjugate of the received vectors of pilot signals, the real part of each product is taken, thus generating the serial-parallel packet of correlation coefficients, reordering in the parallel groups of the serial-parallel packet of correlation coefficients inverse to the reordering of binary symbols of the serial-parallel information packet on the transmitting side is carried out, the serial-parallel packet of binary symbols of orthogonal codes corresponding to the serial-parallel packet of binary symbols of orthogonal codes on the transmitting side and comprising N serial and N parallel groups of binary symbols of orthogonal codes, is generated, correlation of the serial groups of the serial-parallel packet of correlation coefficients to the serial groups of the serial-parallel packet of symbols of orthogonal codes is calculated, forming the parallel packet of N soft decisions corresponding to N binary symbols of the parallel information packet on the transmitting side, parallel-to-serial transformation of the parallel packet of soft decisions is performed, producing the output stream of soft decisions.

2. Method of claim 1 characterized in that, reordering of binary symbols in the parallel groups of serial-parallel information packet is carried out by dyadic shift so that the binary symbols of the k-th parallel group are dyadically shifted by k−1.

3. Method of claim 1 characterized in that, the serial-parallel information packet of the reordered binary symbols is scrambled by the serial-parallel packet of the reordered binary symbols of orthogonal codes by summation by modulo two of each binary symbol of the serial-parallel information packet of the reordered binary symbols with the corresponding binary symbol of the serial-parallel packet of the reordered binary symbols of orthogonal codes.

4. A device of orthogonal transmit-receive diversity comprising, on the transmitting side, M parallel branches (22) of user signal transmission, pilot signal generator (30), N modulators (31) and N antennas (32), thus each signal transmission branch (22) contains serially linked orthogonal modulator (28) and PN spreader (29), the second input of the PN spreader is linked to the output of PN code generator (27), each of N outputs of PN spreader (29) is joined with the input of corresponding modulator (31), the output of each modulator is connected to corresponding transmit antenna (32), on the receiving side, antenna (40), the output of which is joined with the input of demodulator (41), correlator (42) calculating the correlation of the input signal to user's spreading code, N correlators (43) calculating the correlation of the input signal to pilot signals of space-diversity channels, searcher (44), the first inputs of correlators (42, 43) and searcher (44) being combined and linked to the output of demodulator (41), the second input of correlator (42) calculating the correlation of the input signal to user's spreading code, is joined with the first output of reference signal generator (45), generating user's spreading code at the first output, the second inputs of N correlators are linked to the second outputs of reference signal generator (45), producing channel pilot codes at these outputs, the third output of reference signal generator (45) is joined with the input of packet synchronizer, characterized in that, on the transmitting side, each signal transmission branch (22) is added with serial-parallel binary symbol packet generator (23), the input of which is the first input of device and the output is connected to binary symbol reordering unit (24), serially linked serial-parallel orthogonal code binary symbol packet generator (25) and orthogonal code binary symbol reordering unit (26), the second inputs of serial-parallel binary symbol packet generator (23), binary symbol reordering unit (24), serial-parallel orthogonal code binary symbol packet generator (25) and orthogonal code binary symbol reordering unit (26) are combined to form the second input of device, the outputs of binary symbol reordering unit (24) and orthogonal code binary symbol reordering unit (26) are linked to the first and second inputs of orthogonal code modulator (28), respectively, on the receiving side, there are introduced serial correlation vector packet generator (47), the input of which is connected to the output of correlator (42), computing the correlation of the input signal to user's spreading code, and the output—to the first input of serial-parallel correlation coefficient packet generator (48), the second inputs of which are linked to the outputs of N correlators (43), the second input of serial correlation vector packet generator (47) and the third input of serial-parallel correlation coefficient packet generator (48) are combined and linked to the output of packet synchronizer (46), the output of serial-parallel correlation coefficient packet generator (48) is joined with the input of correlation coefficient reordering unit (49), the output of which is connected to the first input of correlator (51), the second input of which is linked to the output of serial-parallel orthogonal code binary symbol packet generator (50), the output of correlator (51) is connected to the input of parallel-to-serial transformation unit (52), the output of which is the output of device.

5. A device according to claim 4 characterized in that unit of summation of modulo 2 is used as orthogonal modulator (20).

* * * * *

UNITED STATES PATENT AND TRADEMARK OFFICE
CERTIFICATE OF CORRECTION

PATENT NO. : 6,510,173 B1
DATED : January 21, 2003
INVENTOR(S) : Garmonov et al.

It is certified that error appears in the above-identified patent and that said Letters Patent is hereby corrected as shown below:

<u>Title page,</u>
Item [75], Inventors, should read

-- [75] Inventors: Alexandr Vasilievich Garmonov
    L. Shevtsovoi (RU)

Yuri Evgenievich Karpitski
    Koltsovskaya (RU) --

Signed and Sealed this

Nineteenth Day of October, 2004

JON W. DUDAS
*Director of the United States Patent and Trademark Office*

UNITED STATES PATENT AND TRADEMARK OFFICE
CERTIFICATE OF CORRECTION

PATENT NO. : 6,510,173 B1
DATED : January 21, 2003
INVENTOR(S) : Garmonov et al.

It is certified that error appears in the above-identified patent and that said Letters Patent is hereby corrected as shown below:

<u>Title page,</u>
Item [73], Assignee, should read

-- [73] Assignee: Alexandr Vasilievich Garmonov
Varonezh, ul. Shevtsovoi, 5/1 kv. 6
Russia (RU) --

Signed and Sealed this

Ninth Day of August, 2005

JON W. DUDAS
*Director of the United States Patent and Trademark Office*